United States Patent [19]

Kikuchi et al.

[11] Patent Number: 4,677,165
[45] Date of Patent: Jun. 30, 1987

[54] RUBBER COMPOSITION FOR TIRE TREAD

[75] Inventors: Yasushi Kikuchi, Odawara; Kazuyoski Kayama, Yokohama; Akinori Tokieda, Chigasaki; Hiroyuki Watanabe, Yokohama; Shuichi Akita, Kamakura, all of Japan

[73] Assignees: The Yokohama Rubber Co., Ltd.; Nippon Zeon Co., Ltd., both of Tokyo, Japan

[21] Appl. No.: 920,335

[22] Filed: Oct. 17, 1986

[30] Foreign Application Priority Data

Oct. 23, 1985 [JP] Japan .................................. 60-235295

[51] Int. Cl.$^4$ ........................................... C08F 236/10
[52] U.S. Cl. ................................ 525/332.9; 526/180;
526/181; 526/340; 524/484
[58] Field of Search ...................... 525/332.9; 526/180,
526/181, 340

[56] References Cited

U.S. PATENT DOCUMENTS

| 3,251,812 | 5/1966 | Hsieh ..................... 526/340 |
| 4,139,690 | 2/1979 | Torigoe et al. ............ 526/180 |
| 4,172,188 | 10/1979 | Ballé et al. ............... 526/342 |
| 4,367,325 | 1/1983 | Takeuchi et al. ........... 526/180 |

FOREIGN PATENT DOCUMENTS

| 649104 | 1/1951 | United Kingdom ............... 526/340 |
| 906315 | 9/1962 | United Kingdom ............. 525/332.9 |

*Primary Examiner*—Paul R. Michl
*Assistant Examiner*—Peter D. Mulcahy
*Attorney, Agent, or Firm*—Armstrong, Nikaido, Marmelstein & Kubovcik

[57] ABSTRACT

A rubber composition for a tire tread comprising a novel modified styrene-butadiene copolymer rubber, carbon black, and aromatic oil.

4 Claims, No Drawings

RUBBER COMPOSITION FOR TIRE TREAD

BACKGROUND

The present invention relates to a rubber composition for a tire tread which comprises a novel modified styrene-butadiene copolymer rubber, and specifically to a rubber composition for a tire tread which has an excellent processability, and is remarkably improved in respect of head build-up without detriment to high grip and abrasion resistance.

With a recent trend of upgrading of the performance of vehicles and spread of the expressway network, a demand for a car tire providing a running stability has been greatly increased. Thus, in the market, a so-called high performance tire having a high grip and an excellent high speed durability has been increasingly demanded, while in the field of racing tires used under severer conditions in races, rallies, etc., there has been an increasing demand for a tire having a tread portion comprising an excellent rubber composition capable of showing a high grip even under extreme road surface conditions and having an excellent blowout resistance.

In the conventional high performance or racing tire, a high grip has been generally secured by using a rubber composition of the tread portion which comprises as the raw material rubber a styrene-butadiene copolymer rubber having a high styrene unit content (hereinafter referred to briefly as "high-styrene SBR"), which is manufactured by the emulsion polymerization method, carbon black having a relatively small particle size, and a large amount of a softener represented by aromatic oil.

However, since such a rubber composition involves a defect in processability of too strongly adhering to the wall, rotor drop door, or roll of a mixer (e.g., a Banbury mixer), a serious difficulty has been experienced in obtaining a practical rubber composition. In addition, such a rubber composition involved another defect in performance of being liable to blow out due to ready heat build-up thereof, thus leading to a poor high speed durability when it is used in a tire tread.

As a result of intensive investigations with a view to solving the above-mentioned problems, the inventors of the present invention have previously found that a composition comprising as a rubber component a high-styrene SBR having specified molecular weight and composition distributions, which is prepared by the solution polymerization method, can remarkably improve the processability, and has low heat build-up and an improved abrasion resistance without detriment to the high grip performance (Japanese Patent Application No. 37,617/1985).

As a result of further investigations, the inventors of the present invention have found that the use of a high-styrene SBR prepared by the solution polymerization and having a specified atomic group introduced into a molecular terminal or chain thereof can provide a rubber composition which has attained a further dramatic decrease in the heat build-up and a remarkable improvement in the blowout resistance while keeping the excellent processability and the high grip performance. This has led to completion of the present invention.

SUMMARY

An object of the present invention is to provide a rubber composition suitably utilized particularly in treads of high-performance tires and racing tires used in races, rallies, etc., which composition has an excellent processability, low heat build-up, and a high blowout resistance.

Thus, in accordance with the present invention, there is provided a rubber composition for a tire tread which comprises 100 parts by weight of a sole rubber component consisting of a styrene-butadiene copolymer rubber prepared by random copolymerization of styrene with 1,3-butadiene according to the solution polymerization using an organic lithium polymerization catalyst and satisfying the below-mentioned requirements (a) to (f), or a rubber blend comprising 50 parts by weight of such a copolymer rubber; 80 to 250 parts by weight of carbon black having a specific surface area by nitrogen adsorption ($N_2$ SA) of 100 to 400 m$^2$/g; and 30 to 280 parts by weight of aromatic oil:

(a) the content of bound styrene units is 25 to 50 wt. %;

(b) the content of 1,2-bonds in butadiene units is 5 to 50%;

(c) the proportion of styrene units constituting long-chain styrene blocks having 8 or more styrene units in bonded styrene units is 10.0% or lower;

(d) the Mooney viscosity [$ML_{1+4}$ (100° C.)] is 65 or higher;

(e) in the molecular weight distribution as measured by gel permeation chromatography, the ratio of the weight-average molecular weight ($\overline{Mw}$) to the number-average molecular weight ($\overline{Mn}$) is 2.5 or lower, while the proportion of polymer molecules having a molecular weight of lower than 150,000 is 18 wt. % or lower, and the proportion of polymer molecules having a molecular weight of lower than 100,000 is 10 wt. % or lower;

(f) an atomic group represented by the following formula (1) and/or (2) is introduced into a molecular terminal or chain of the copolymer:

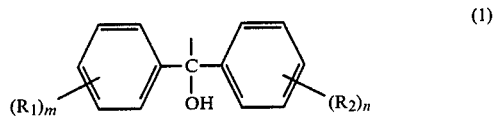

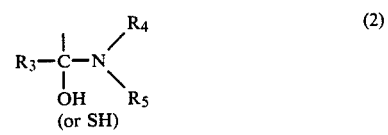

wherein $R_1$, $R_2$, $R_3$, $R_4$, and $R_5$ each stands for hydrogen or a substituent; $R_3$ maybe bound with $R_4$ or $R_5$ to form a ring; and m and n each stands for an integer.

The foregoing and other objects, and features of the present invention will become apparent from the following description.

THE PREFERRED EMBODIMENT

The styrene-butadiene copolymer rubber (hereinafter referred to as "SBR") to be used in the present invention is obtained by random copolymerization of styrene with 1,3-butadiene in the presence of a polymerization catalyst based on an organic lithium compound according to the solution polymerization, and satisfys the above-mentioned requirements (a) to (f).

(a) The content of bound styrene units must be 25 to 50 wt. % in order to secure a high grip. When it is lower than 25 wt. %, no sufficient grip be secured. On the other hand, when it exceeds 50 wt. %, the heat build-up is adversely affected.

(b) The content of 1,2-bonds in butadiene units must be within a range of 5 to 50%. When it is lower than 5%, a difficulty is encountered in manufacturing. When it exceeds 50%, the breaking strength and the abrasion resistance are unfavorably decreased notably, although the grip performance is advantageously improved.

(c) As for the abrasion resistance and the heat build-up, it is advantageous that the amount of block-constituting styrene units is as small as possible. Thus, the proportion of styrene units constituting long-chain styrene blocks having 8 or more styrene units in all bonded styrene units must be 10.0% or lower and is preferably 5% or lower.

(d) In order to secure excellent processability, the Mooney viscosity [$ML_{1+4}$ (100° C.)] must be 65 or higher.

(e) In the molecular weight distribution as measured by gel permeation chromatography, the ratio of the weight-average molecular weight ($\overline{Mw}$) to the number-average molecular weight ($\overline{Mn}$) must be 2.5 or lower, while the proportion of polymer molecules having a molecular weight of lower than 150,000 must be 18 wt. % or lower, and the proportion of polymer molecules having a molecular weight of lower than 100,000 must be 10 wt. % or lower.

When the molecular weight distribution is wide with $\overline{Mw}/\overline{Mn}$ being 2.5 or more, or when the proportion of low-molecular weight polymer molecules having a molecular weight of lower than 150,000 is above the above-mentioned range, the rubber composition containing large amounts of carbon black and aromatic oil blended therein is very sticky, and hence is undesirably poor in processability.

(f) An atomic group represented by the above-mentioned formula (1) and/or (2) is introduced by way of a carbon-carbon bond into a molecular terminal or chain of the copolymer.

In the atomic group, $R_1$, $R_2$, $R_3$, $R_4$, and $R_5$ are each hydrogen or a substituent. $R_3$ may be bound with $R_4$ or $R_5$ to form a ring. Although the substituent is not particularly specified, $R_1$ and $R_2$ are each preferably an atomic group selected from among amino, alkylamino, and dialkylamino groups in the above-mentioned formula (1), while $R_4$ and $R_5$ bonded to nitrogen are each preferably an alkyl group in the above-mentioned formula (2).

The styrene-butadiene copolymer rubber having an atomic group introduced by way of a carbon-carbon bond into the molecular chain thereof is prepared by polymerization in the presence of, for example, an organic lithium compound catalyst to yield a styrenebutadiene copolymer, and addition of a compound having an atomic group represented by the formula (1) and/or (2) to the resulting solution obtained after completion of the polymerization reaction. After completion of the reaction, the copolymer having an atomic group introduced thereinto and represented by the formula (1) and/or (2) is recovered from the reaction mixture by a customary separation method such as addition of a coagulating agent such as methanol or stripping with steam.

Specific examples of the compound that may be added for introduction of an atomic group represented by the above-mentioned formula (1) include 4,4'-bis(-dimethylamino)benzophenone, 4,4'-bis(diethylamino)-benzophenone, 4,4'-diaminobenzophenone, and 4-dimethylaminobenzophenone.

Specific examples of the compound that may be added for introduction of an atomic group represented by the above-mentioned formula (2) include N,N-dimethylnicotinamide, N,N-dimethylformamide, N,N,N',N'-tetramethylurea, N-methyl-2-pyrrolidone, and N-methyl-ε-caprolactam; and their corresponding sulfur-containing compounds.

The rubber composition comprising the styrenebutadiene copolymer having an atomic group introduced thereinto by the reaction thereof with such a compound and represented by the above-mentioned formula (1) and/or (2) can dramatically reduce the heat build-up and improve the blowout resistance without detriment to the processability, the grip, the abrasion resistance, and other properties.

The rubber composition of the present invention is a blend comprising 100 parts by weight of a sole rubber component consisting of the above-mentioned SBR or a rubber blend comprising 50 parts by weight or more of the above-mentioned SBR, 80 to 250 parts by weight of carbon black, and 30 to 280 parts by weight of aromatic oil. This rubber composition of the present invention may be arbitrarily blended with a blending agent as commonly blended in a cap tread rubber, such as zinc oxide, stearic acid, one of various antioxidants, wax, a vulcanization accelarator, sulfur, or the like.

The rubber blend comprising 50 parts by weight of the above-mentioned SBR is a blend composed of the SBR and at least one kind of rubber preferably having a Mooney viscosity [$ML_{1+4}$(100° C.)] of 50 or higher and selected from among, for example, natural rubber, polyisoprene rubber, acrylonitrile-butadiene rubber, polybutadiene rubber, butyl rubber, and styrene-butadiene rubber other than the above-mentioned SBR, and including 50 parts by weight or more of the above-mentioned SBR.

In order to secure a high grip, the carbon black has a specific surface area by nitrogen adsorption ($N_2$ SA) of 100 to 400 m²/g. When the $N_2$ SA is smaller than 100 m²/g, not only the grip performance but also abrasion resistance is unfavorably decreased. When the $N_2$ SA exceeds 400 m²/g, not only is the dispersibility poor, but also the heat build-up is adversely affected.

The following Examples and Comparative Examples will now specifically illustrate the present invention.

EXAMPLES AND COMPARATIVE EXAMPLES

The blending components as listed in Table 1 except for the vulcanization accelerator and sulfur were kneaded in a 1.7-1 Banbury mixer for 6 min, and admixed and kneaded with the vulcanization accelerator and sulfur in 8-inch rolls for 4 min. Thus, various rubber compositions were prepared. Each rubber composition was press-vulcanized at 160° C. for 25 min. The properties of the obtained vulcanizate were examined. The results are shown in Table 2.

The properties of each SBR listed in Table 1 are shown in Table 2. Identification of the structure (bound styrene content and 1,2-bond content of butadiene units) of each SBR was made by NMR using proton. The proportion of styrene units constituting long-chain styrene blocks having 8 or more styrene units was examined by gel permeation chromatography (GPC) of a decomposition product obtained by ozone cleavage of all double bonds in butadiene units (see Kobunshi Gakkai Yokoshu, vol. 29, No. 9, page 2055). The Mooney viscosity [$ML_{1+4}$ (100° C.)] was measured in accordance with JIS K 6383. The GPC apparatus used in examination of $\overline{Mw}/\overline{Mn}$ as the index representing the molecular weight distribution and determination of low molecular weight polymer molecules in the present invention is a model ALC/GPC 150-C manufactured by Waters Instruments, Inc. A differential refractometer was used as the detector, while four columns of Ultrastyragel manufactured by Waters Instruments, Inc. were used. Tetrahydrofuran was used as the mobile phase.

TABLE 1

| Component | parts by weight |
| --- | --- |
| SBR | 100.0 |
| SAF carbon black (1) | 120.0 |
| zinc oxide | 3.0 |
| stearic acid | 2.0 |
| aromatic oil | 117.5 |
| vulcanization accelerator OBS (2) | 1.7 |
| surfur | 2.5 |

Notes:
(1) Diablack A, manufactured by Mitsubishi Chemical Industries Ltd.
(2) N—oxydiethylene-2-benzothiazylsulfenamide The processability and the properties of vulcanizates listed in Table 1 were examined according to the following methods.

Processability

Workability was evaluated using 8-inch rolls with a gear ratio of 1.08 while keeping the roll surface temperature constant. Evaluation was made in accordance with the five-point method wherein point 1 (worst) was given to a sample with such a high adhesion as to be hardly capable of being peeled from the roll surfaces.

Grip performance

The skid value was measured with a British portable skid tester. A Safety Walk manufactured by 3M Company was used as the road surface. The measurement was conducted under two conditions, namely a wet condition provided by wetting the road surface with distilled water and a dry condition without wetting. The value was expressed in terms of an index relative to an index of 100 for Comparative Example 1. The higher the value, the better the grip performance.

Abrasion resistance

The measurement was conducted using a Pico abrasion tester in accordance with ASTM D2228 at 60 rpm and under a load of 4.5 kg. Evaluation was made using the reciprocal of a weight loss due to abrasion. The value was expressed in terms of an index relative to an index of 100 for Comparative Example 1. The higher the value, the better the abrasion resistance.

Heat build-up and blowout resistance

Both properties were examined using a Goodrich flexometer. The heat built-up was examined in terms of ΔT (°C.) under a load of 15 kg at a stroke of 4.44 mm at a frequency of vibration of 1,800 rpm. The lower the value, the smaller the heat build-up. The blowout resistance was examined in terms of the time which has elapsed till occurrence of blowout as measured in an atmosphere of 100° C. under a load of 15 kg at a stroke of 5.71 mm at a frequency of vibration of 1,800 rpm. Evaluation was made in terms of an index relative to an index of 100 for Comparative Example 1. The higher the value, the better the blowout resistance.

As is apparent from Table 2, very good processabilities were observed in Examples as compared with those in Comparative Examples. Furthermore, remarkable improvements were attained in heat build-up and blowout resistance without detriment to the grip performance and the abrasion resistance.

TABLE 2

| | | | Com. Ex. 1 | Com. Ex. 2 | Com. Ex. 3 |
| --- | --- | --- | --- | --- | --- |
| Properties of SBR | polymerization method | | solution polymerization | emulsion polymerization | solution polymerization |
| | Bonded styrene unit content (wt %) | | 35 | 35 | 36 |
| | 1,2-Bond content (%) | | 18 | 19 | 26 |
| | Proportion of styrene units constituting long-chain styrene blocks having 8 or more styrene units (wt. %) | | 1.0 | 0 | 5.0 |
| | Mooney viscosity ($ML_{1+4}$ 100° C.) | | 120 | 130 | 130 |
| | GPC characteristics | Mw/Mn | 2.2 | 4.3 | 3.0 |
| | | Proportion of polymer molecules having molecular weight of smaller than 150,000 (wt. %) | 15.2 | 24.7 | 21.5 |
| | | Proportion of polymer molecules having molecular weight of smaller than 100,000 (wt. %) | 8.1 | 15.4 | 11.3 |
| | Compound introduced into molecular chain | Name | — | — | — |
| | | Amount of addition (mmol) | — | — | — |
| | | Others | | | Sn coupling |
| Properties of vulcanizate | Grip performance | Wet condition | 100 | 97 | 101 |
| | | Dry condition | 100 | 96 | 101 |
| | Abrasion resistance | | 100 | 95 | 100 |
| | Heat build-up ΔT (°C.) | | 30 | 37 | 33 |
| | Blowout resistance | | 100 | 73 | 90 |
| | Processability (five-point method) | | 4 | 1 | 1 |

TABLE 2-continued

| | | Ex. 1 | Ex. 2 | Ex. 3 |
|---|---|---|---|---|
| Properties of SBR | polymerization method | solution polymerization | solution polymerization | solution polymerization |
| | Bonded styrene unit content (wt. %) | 35 | 40 | 32 |
| | 1,2-Bond content (%) | 26 | 10 | 30 |
| | Proportion of styrene units constituting long-chain styrene blocks having 8 or more styrene units (wt. %) | 2.5 | 0 | 0 |
| | Mooney viscosity (ML$_{1+4}$ 100° C.) | 130 | 135 | 140 |
| | GPC characteristics — Mw/Mn | 2.1 | 2.3 | 1.9 |
| | Proportion of polymer molecules having molecular weight of smaller than 150,000 (wt. %) | 7.3 | 10.0 | 6.7 |
| | Proportion of polymer molecules having molecular weight of smaller than 100,000 (wt. %) | 2.7 | 5.6 | 2.1 |
| | Compound introduced into molecular chain — Name | 4,4'-bis-(diethylamino)benzophenone | N,N—dimethyl-nicotinamide | N—methyl-2-pyrrolidone |
| | Amount of addition (mmol) | 1.5 | 1.0 | 1.0 |
| | Others | | | |
| Properties of vulcanizate | Grip performance — Wet condition | 102 | 101 | 100 |
| | Grip performance — Dry condition | 101 | 100 | 100 |
| | Abrasion resistance | 100 | 100 | 101 |
| | Heat build-up ΔT (°C.) | 26 | 26 | 22 |
| | Blowout resistance | 127 | 125 | 135 |
| | Processability (five-point method) | 5 | 5 | 5 |

As discussed above, since the rubber composition of the present invention comprises a novel modified styrene-butadiene copolymer rubber, remarkable improvements can be materialized in heat build-up and blowout resistance without detriment to the excellent processability and the high grip performance. Thus, the rubber composition of the present invention can be suitably utilized particularly in treads of high-performance tires and racing tires used in races, rallies, etc.

We claim:

1. A rubber composition for a tire tread which comprises 100 parts by weight of a sole rubber component consisting of a styrene-butadiene copolymer rubber prepared by random copolymerization of styrene with 1,3-butadiene according to the solution polymerization method by using a polymerization catalyst based on an organic lithium compound and satisfying the below-mentioned requirements (a) to (f), or a rubber blend comprising 50 parts by weight of said copolymer rubber; 80 to 250 parts by weight of carbon black having a specific surface area by nitrogen adsorption (N$_2$ SA) of 100 to 400 m$^2$/g; and 30 to 280 parts by weight of an aromatic oil:

(a) the content of bound styrene units is 25 to 50 wt. %;

(b) the content of 1,2-bonds in butadiene units is 5 to 50%;

(c) the proportion of styrene units constituting long-chain styrene blocks having 8 or more styrene units in bonded styrene units is 10.0% or lower;

(d) the Mooney viscosity [ML$_{1+4}$ (100° C.)] is 65 or higher;

(e) in the molecular weight distribution as measured by gel permeation chromatography, the ratio of the weight-average molecular weight ($\overline{Mw}$) to the number-average molecular weight ($\overline{Mn}$) is 2.5 or lower, while the proportion of polymer molecules having a molecular weight of lower than 150,000 is 18 wt. % or lower, and the proportion of polymer molecules having a molecular weight of lower than 100,000 is 10 wt. % or lower;

(f) an atomic group represented by the following formula (1) and/or (2) is introduced into a molecular terminal or chain of said copolymer:

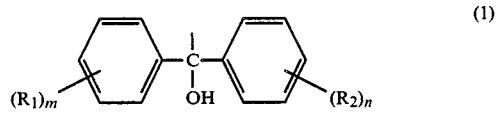

(1)

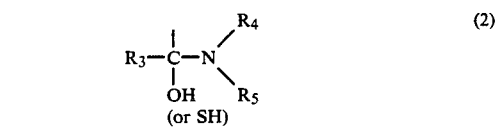

(2)

wherein R$_1$, R$_2$, R$_3$, R$_4$, and R$_5$ each stands for hydrogen or a substituent; R$_3$ may be bound with R$_4$ or R$_5$ to form a ring; and m and n each stands for an integer.

2. A rubber composition for a tire tread as claimed in claim 1, wherein R$_1$ and R$_2$ are each an amino, alkylamino, or dialkylamino group.

3. A rubber composition for a tire tread as claimed in claim 1, wherein R$_4$ and R$_5$ are each an alkyl group.

4. A rubber composition for a tire tread as claimed in claim 1, wherein said rubber blend comprises natural rubber, polyisoprene rubber, acrylonitrilebutadiene rubber, polybutadiene rubber, butyl rubber, styrene-butadiene rubber other than said styrenebutadiene copolymer rubber, or a mixture thereof in addition to said styrene-butadiene copolymer rubber.

* * * * *